(12) United States Patent
Meyer et al.

(10) Patent No.: US 12,533,978 B2
(45) Date of Patent: Jan. 27, 2026

(54) POWER-DENSIFYING CHARGING STATION

(71) Applicant: GM GLOBAL TECHNOLOGY OPERATIONS LLC, Detroit, MI (US)

(72) Inventors: Robert J. Meyer, Highland, MI (US); Piero Sobral Genaro, São Paulo (BR); Alex Cardoso Santos, São Bernardo do Camp (BR)

(73) Assignee: GM Global Technology Operations LLC, Detroit, MI (US)

( * ) Notice: Subject to any disclaimer, the term of this patent is extended or adjusted under 35 U.S.C. 154(b) by 754 days.

(21) Appl. No.: 17/951,238

(22) Filed: Sep. 23, 2022

(65) Prior Publication Data
US 2024/0106259 A1 Mar. 28, 2024

(51) Int. Cl.
| | | |
|---|---|---|
| *B60L 53/30* | (2019.01) | |
| *B60L 53/53* | (2019.01) | |
| *B60L 53/55* | (2019.01) | |
| *H02J 7/02* | (2016.01) | |
| *H02J 7/34* | (2006.01) | |

(52) U.S. Cl.
CPC .............. *B60L 53/30* (2019.02); *B60L 53/53* (2019.02); *B60L 53/55* (2019.02); *H02J 7/02* (2013.01); *H02J 7/342* (2020.01); *H02J 7/345* (2013.01); *B60L 2210/30* (2013.01)

(58) Field of Classification Search
CPC ....................................................... B60L 53/30
USPC ........................................................ 320/109
See application file for complete search history.

(56) References Cited

U.S. PATENT DOCUMENTS

| | | | | |
|---|---|---|---|---|
| 6,639,370 | B1* | 10/2003 | Gabrys ................. | H02J 15/007 |
| | | | | 318/434 |
| 11,267,358 | B2* | 3/2022 | Smolenaers ............. | H02J 7/02 |
| 2015/0328999 | A1* | 11/2015 | Dureau ................ | H02J 7/0029 |
| | | | | 320/109 |
| 2015/0336197 | A1* | 11/2015 | DeLisio ............... | B23K 9/1006 |
| | | | | 219/133 |
| 2019/0168630 | A1* | 6/2019 | Mrlik ...................... | B60L 53/60 |
| 2021/0376634 | A1* | 12/2021 | Smith ..................... | H02M 7/48 |
| 2022/0348099 | A1* | 11/2022 | Araki ...................... | B60L 53/14 |
| 2022/0407349 | A1* | 12/2022 | Owens .................... | B60L 53/51 |
| 2025/0074236 | A1* | 3/2025 | Lee ......................... | B60L 53/56 |

* cited by examiner

*Primary Examiner* — Jerry D Robbins
(74) *Attorney, Agent, or Firm* — Quinn IP Law

(57) ABSTRACT

A power-densifying charging station includes a low-power charging module (LPCM), a direct current (DC) storage device, electrical switches, and a controller. The LPCM receives a low-power input voltage from a low-power energy source. The DC storage device accumulates a high-power DC voltage from the low-power input voltage during a charge accumulation stage of operation. The switches selectively connect the charging station to the energy source, the LPCM to the DC storage device, and the DC storage device to a high-voltage offboard battery pack during a charge delivery stage of operation. The controller is in communication with and operable for controlling the LPCM, the DC storage device, and the switches during the charge accumulation and delivery stages of operation via performance of a corresponding method.

20 Claims, 4 Drawing Sheets

POWER-DENSIFYING CHARGING STATION

INTRODUCTION

Electrochemical battery cells and battery packs constructed from series-connected and/or parallel-connected strings of such battery cells are used as high-voltage direct current (DC) power supplies in a wide array of battery electric systems. An electric vehicle (EV) for instance includes a propulsion battery pack constructed from an application-suitable number of cylindrical, prismatic, or pouch-style battery cells. The propulsion battery pack, which is connected to a high-voltage bus aboard the EV, ultimately powers one or more electric traction motors and associated power electronic components during battery discharging modes. During battery charging modes, a charging current is provided to the constituent battery cells of the battery pack. Offboard electric vehicle supply equipment (EVSE) in the form of an EV charging station may provide the charging current to the battery pack when the EV is idle, or the EV may self-generate at least some of the necessary battery power during operation, e.g., via regenerative braking.

Charging stations are typically equipped to provide one of three different charging levels, with the charging levels nominally referred to in the art as Level 1, Level 2, and Level 3. Level 1 and Level 2 chargers utilize power from an available alternating current (AC) power supply, e.g., 110-120 VAC/20 A (Level 1) or 220-240 VAC/40 A (Level 2) for typical North American residential and commercial grid power. Level 3 chargers in contrast are used to expedite the charging process by delivering a DC charging voltage/current from a high-voltage charging station directly to the battery pack. Such a process is referred to in the art as DC fast charging (DCFC).

In each of the above-summarized charging levels, AC-to-DC power conversion occurs between the AC power supply and the DC battery pack. When using an AC charging station, i.e., Level 1 and Level 2 charging stations, the power conversion process typically occurs aboard the EV using an onboard charger (OBC). In contrast, the power conversion process used for performing DCFC events may occur within a larger voltage converter housed within a cabinet of the charging station. Currently, Level 1 and 2 charging stations are available for use with standard AC grid service, while DCFC charging stations are typically limited to commercial locations having specialized high-power infrastructure. Thus, EV owners at present are unable to fully enjoy the convenience, practicality, and increased charging speeds of home-based DCFC/Level 3 charging.

SUMMARY

An aspect of the present disclosure includes a power-densifying charging station comprising a low-power charging module (LPCM) configured to receive a low-power input voltage from a low-power energy source, a DC storage device operable for accumulating a high-power DC charging voltage from the low-power input voltage during a charge accumulation stage of operation, a plurality of electrical switches, and a controller. The switches are operable for selectively connecting the charging station to the low-power energy source, the LPCM to the DC storage device, and the DC storage device to a high-voltage offboard battery pack during a charge delivery stage of operation. The controller, which is in communication with and operable for controlling a corresponding state of the LPCM, the DC storage device, and the plurality of electrical switches during the charge accumulation stage and the charge delivery stage, is characterized by an absence of use of a boost converter.

The low-power energy source includes an AC power supply in one or more embodiments. In such embodiments, the LPCM may include an AC-to-DC converter operable for converting the low-power input voltage from an AC waveform to a DC waveform. The AC power supply may be embodied as residential or commercial grid power.

The charging station may also include a charge coupler configured to connect the DC storage device to an external system having the high-voltage battery pack. When the external system is an electric vehicle (EV) having a DC charging port and the high-voltage battery pack is a propulsion battery pack of the EV, the charge coupler may be embodied as a Level 3 DC charge coupler configured to connect to the DC charging port.

The low-power input voltage in one or more embodiments is less than 240 VAC and the high-voltage battery pack may have a voltage capability of at least 400 VDC.

The DC storage device may include an electrochemical battery pack having a plurality of battery cells, or the DC storage device may include a supercapacitor system.

The DC storage device in one or more embodiments includes a flywheel arrangement having a low-power AC motor, a flywheel connected to the low-power AC motor, and a high-power DC generator connected to the flywheel.

Another aspect of the disclosure includes a method for densifying power from a low-power energy source using a power-densifying charging station. An embodiment of such a method includes, during a charge accumulation stage of operation: closing a first electrical switch of the charging station to thereby connect a low-power charging module (LPCM) of the charging station to the low-power energy source, with the source providing a low-power input voltage to the LPCM, and accumulating a high-power DC charging voltage in a DC storage device of the charging station using the low-power input voltage from the LPCM. During a charge delivery stage subsequent to the charge accumulation stage, the method includes selectively offloading the high-power DC charging voltage from the DC storage device to a battery pack of an external device via a third electrical switch and a DC charge coupler. The charge accumulation and delivery stages are characterized by an absence of use of a boost converter.

A power-densifying charging station in accordance with another construction includes the LPCM configured to receive a low-power AC input voltage from a residential or commercial grid, with the LPCM having an AC-to-DC converter operable for converting the low-power AC input voltage to a low-power DC voltage. The charging station also includes a DC storage device having electrochemical battery cells collectively operable for accumulating a high-power DC charging voltage from the low-power DC voltage during a charge accumulation stage of operation, and a plurality of electrical switches operable for selectively connecting the charging station to the residential or commercial grid, the LPCM to the DC storage device, and the DC storage device to a high-voltage propulsion battery pack of an electric vehicle (EV) during a charge delivery stage of operation.

Additionally, the charging station in this embodiment includes a Level 3 DC charge coupler and a controller in communication with and operable for controlling the LPCM, the DC storage device, and the electrical switches during the charge accumulation stage and the charge delivery stage. The controller is operable for offloading the high-power DC charging voltage to the propulsion battery pack via the Level 3 DC charge coupler during the charge delivery stage of operation.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

Figure 1:
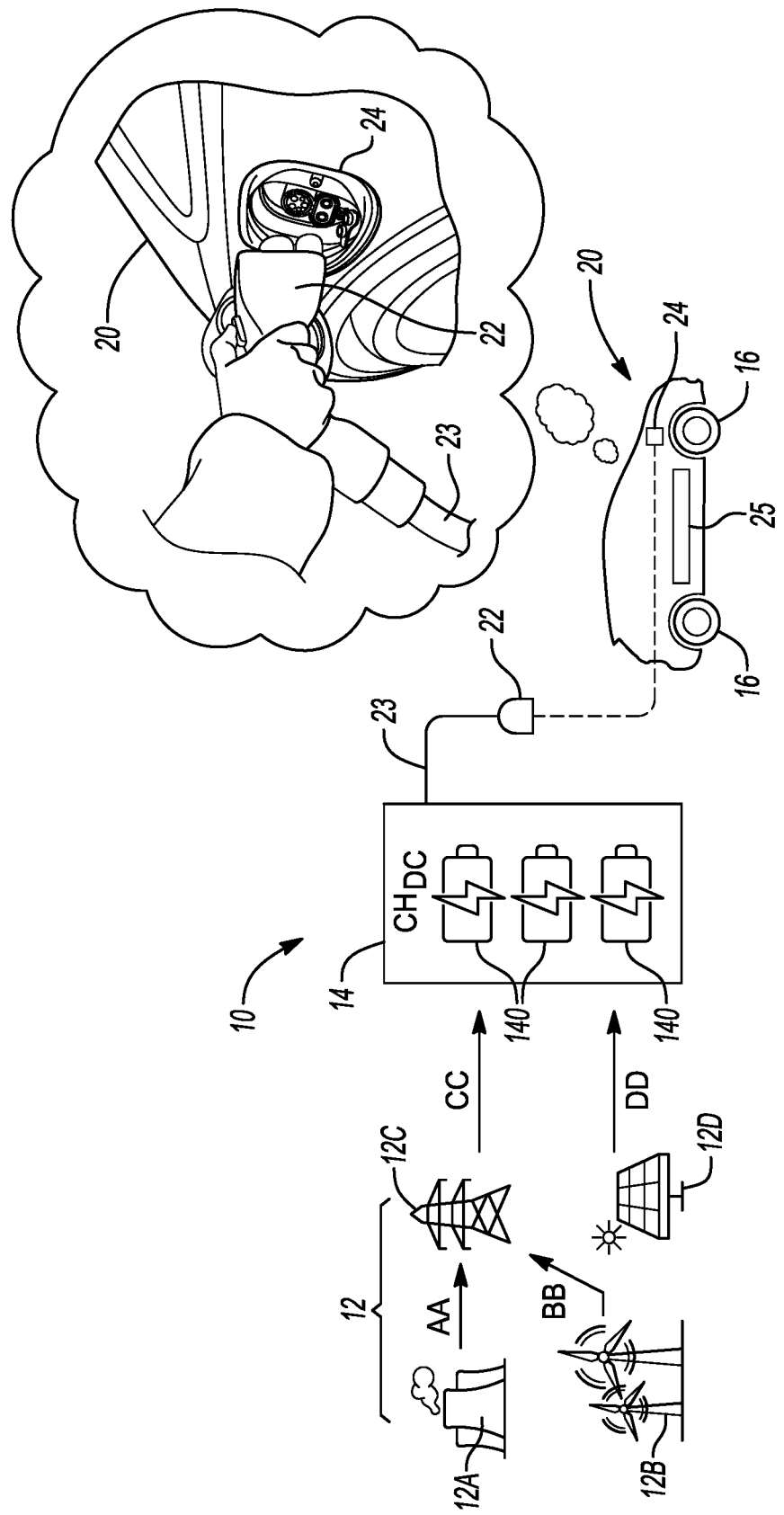
FIG. 1 illustrates a power-densifying charging station constructed in accordance with the present disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

A power-densifying charging station as disclosed herein is capable of extending the benefits of direct current fast charging (DCFC) to residential or commercial charging locations equipped with a low-power energy source, e.g., standard grid power or solar power. Components of the charging station effectively function herein as a "power densifier" by gradually accumulating a high-voltage DC charge in energy storage cells of a direct current (DC) storage device. The DC storage device, e.g., a multi-cell battery pack, a supercapacitor system/capacitor bank, or a flywheel arrangement in various embodiments, thus stores the high-voltage DC charge in a ready state. The stored DC charge is later selectively offloaded to a depleted battery pack, e.g., of an electric vehicle (EV) or another electrified system. The present teachings therefore contemplate a charge accumulation stage of operation, which may occur over an extended duration ("first interval"), followed by a charge delivery stage of operation performed over a shorter duration ("second interval"), with the first and second intervals being non-concurrent.

By way of example, residential grid power of up to 240 VAC/40 A and associated Level 2 charging is typically able to provide about 7-8 kW of charging power over a typical 8-9 hour charging period, i.e., the first interval. In some use cases, such as when charging an EV at home or when charging an electric delivery van or another high-use/quick-turnaround vehicle or other electrified mobile platform, the vehicle may have a very limited window of availability for charging. This abbreviated window is representative of the above-noted second interval. The DC storage device of the present disclosure in such a case may be selectively discharged, e.g., for about 20-60 minutes. The charging stage thereafter repeats, with the low-power energy source once again used to gradually accumulate a high-voltage DC charge in the DC storage device for use in performing a subsequent DCFC event.

Referring to the drawings, wherein like reference numbers refer to like features throughout the several views, FIG. 1 depicts a power-densifying charging station 10, i.e., an EV charging station functioning as a gradual accumulator and densifier of low-power energy for the purpose of performing a later DCFC event. As summarized above, the power-densifying charging station 10 is capable of extending the benefits and convenience of DCFC to residential, commercial, and other charging locations equipped with a low-power energy source 12. As used herein, the terms "low-power" and "high-power" are relative, with "low" referring to power levels commonly provided by grid power, e.g., about 5-10 kW, and with "high" referring to typical DCFC power levels, for instance about 50-350 kW. Thus, high-power may entail levels of at least ten times that of low-power in one or more embodiments. Likewise, relatively low/high voltage levels corresponding to such power levels in some implementations include less than about 110-240 VAC (low) and more than about 400 VDC or more (high).

The low-power energy source 12 of FIG. 1 may optionally include one or more alternating current (AC) power supplies, as represented by a power plant 12A, wind turbines 12B, and associated power transmission lines 12C, each of which provides output power as indicated by arrows AA, BB, and CC, respectively. Hydroelectric plants (not shown) and other possible sources of low-voltage AC power are also possible embodiments of the low-power energy source 12. Alternatively, the low-power energy source 12 could utilize DC or AC solar power from one or more solar panels 12D, with AC embodiments of such solar panels 12D having an integral microinverter, as appreciated in the art. Thus, the low-power energy source 12 may provide AC power, DC power, or both depending on the location and configuration of the power-densifying charging station 10. For illustrative consistency, the low-power energy source 12 will be described hereinafter in the context of residential or commercial grid power without limiting the scope of the disclosure to such an embodiment.

The power-densifying charging station 10 within the scope of the present disclosure acts as a power densifier as noted above by gradually accumulating a DC charge ("CHdc") from the low-voltage/low-power energy furnished by the low-power energy source 12. The DC charge is temporarily stored in one or more energy storage cells 140 of a DC storage device 14 over a first interval, e.g., about 8-10 hours. The particular capacity of the DC storage device 14 may be scaled to properly serve the desired end use, with a capacity range of about 50-100 kWh being representative.

The DC storage device 14 in a possible configuration includes a multi-cell battery pack in which the energy storage cells 140 are configured as lithium-ion or other application-suitable electrochemical battery cells. In some embodiments, each respective one of the battery cells has a voltage capability of about 3-4 volts. Alternatively, the energy storage cells 140 may form a capacitor bank or supercapacitor in which the energy storage cells 140 are individual capacitors, or a flywheel arrangement 240 (see FIG. 3) in various embodiments. The DC storage device 14 stores the DC charge until it is needed for a DCFC event. A method 100 for performing such an event is described in detail below with reference to FIG. 4.

The DCFC event as contemplated herein includes a coordinated offloading of the stored DC charge to a DC load of an external system, in this instance a high-voltage, electrochemical propulsion battery pack 25 of an EV 20 having one or more powered road wheels 16, or a similar battery pack of a plug-in hybrid electric vehicle or another mobile platform such as a boat, watercraft, airplane, rail vehicle, farm equipment, etc. After gradually accumulating or building the high-voltage/high-power stored DC charge over an extended first interval, e.g., about 8-9 hours, selective offloading of the stored DC charge occurs over a shorter second interval, such as about 20-60 minutes. The first and second intervals are non-concurrent during ordinary operation of the low-power charging station 10. For example, the low-power charging station 10 may gradually accumulate the stored DC charge overnight or during another period of low energy demand when using grid power, or during peak daylight hours when using the solar device 12D, followed by performance of the DCFC event the following day or several days or weeks later.

In order to perform the DCFC event, the power-densifying charging station 10 of FIG. 1 is equipped with a charge coupler 22, e.g., a Level 3 DC charge coupler, which in turn is disposed on a charging cable 23. The Level 3 charge coupler, which may be embodied as a Combined Charging System (CCS) charge coupler, a CHAdeMO charge coupler, or another suitable industry standard charger, is configured to connect to the EV 20, and to selectively offload the stored DC charge to the propulsion battery pack 25. As appreciated by those skilled in the art, the charge coupler 22 when configured as an industry-standard Level 3 charger is configured to mate up with a DC charging port 24 located on the EV 20, i.e., with charging pins (not shown) of the charge coupler 22 engaging corresponding receptacles of the DC charging port 24, such that the EV 20 is electrically connected to the charging station 10. The propulsion battery pack 25 in a typical embodiment has a voltage capability of at least about 400 VDC or more, i.e., substantially higher than the typical voltage levels supplied by the low-power energy source 12 during the charge accumulation stage of operation.

Figure 2:
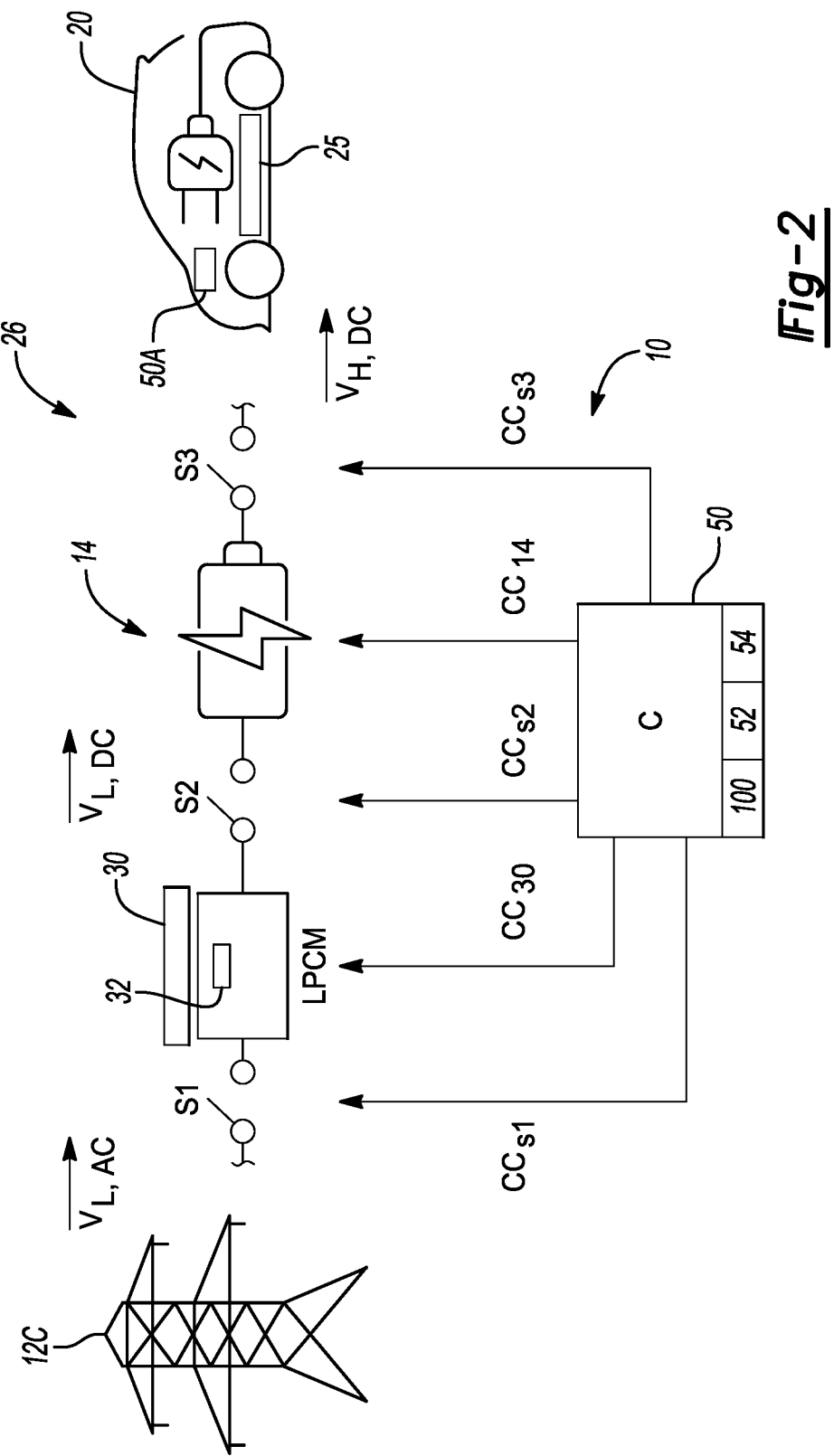
FIG. 2 schematically illustrates a controller usable with the power-densifying charging system of FIG. 1.

Referring briefly to FIG. 2, implementation of the present teachings is possible using an electrical gateway circuit 26 having, in a simplified implementation, at least a first electrical switch S1, a second electrical switch S2, and a third electrical switch S3. The power-densifying charging station 10 of FIG. 1 is connectable in some configurations to the low-power energy source 12, in this exemplary case the transmission lines 12C of the grid, e.g., 208-220 VAC grid power. This action occurs via the first electrical switch S1, such that a low-power AC input voltage (arrow $V_{L,AC}$) is provided to the power-densifying charging station 10.

As best shown in FIG. 2, the power-densifying charging station 10 may include a low-power charging module (LPCM) 30 that is connectable to the low-power energy source 12 via operation of the first electrical switch S1. The LPCM 30 in some embodiments may include an AC-to-DC converter 32 operable for converting an AC input waveform of the low-power AC input voltage (arrow $V_{L,AC}$) to a low-power DC voltage ($V_{L,DC}$) over the first interval, thereby providing the DC storage device 14 with the stored DC charge, i.e., $CH_{DC}$ (FIG. 1). Other components not shown but well understood in the art include one or more transformers for maintaining galvanic isolation, filters, etc. In other embodiments the low-power AC input voltage (arrow $V_{L,AC}$) could instead be a DC input voltage, such as a low-voltage provided by the solar panel(s) 12D of FIG. 1 when the solar panel(s) 12D are configured as DC panels, i.e., not equipped with an integral microinverter as noted above. As part of the non-limiting embodiment shown in FIG. 2, the DC power storage device 14 is connectable to the LPCM 30 via operation of the second electrical switch S2. The third electrical switch S3 for its part connects the DC power storage device 14 to the charging cable 23 and the Level 3 DC charge coupler 22, and thus ultimately provides a high-power DC charging voltage (arrow $V_{H,DC}$) to the EV 20 as a suitable DCFC voltage.

A controller (C) 50 shown schematically in FIG. 2 is configured to regulate a switching state (ON/OFF state) of the electrical gateway circuit 26, i.e., the first, second, and third switches S1, S2, and S3, respectively. This action may be regulated by corresponding switching control signals (arrows $CC_{s1}$, $CC_{s2}$, and $CC_{s3}$). Separate control and feedback signals (arrows $CC_{30}$ and $CC_{14}$) may be used for regulating operation of the LPCM 30 and the DC storage device 14, e.g., by charging the DC storage device 14 to full capacity and thereafter disabling the LPCM 30 as described below with reference to the method 100 of FIG. 4. In this manner, the controller 50 selectively enables the LPCM 30 to deliver or offload the stored DC charge to the DC power storage device 14 over the second internal noted above.

The controller 50 may be equipped with one or more processors 52, e.g., logic circuits, combinational logic circuit(s), application specific integrated circuit(s), electronic circuit(s), central processing unit(s), semiconductor IC devices, etc., as well as input/output circuit(s), appropriate signal conditioning and buffer circuitry, and other components such as a high-speed clock to provide the described functionality. An associated tangible non-transitory computer-readable storage medium, collectively referred to as memory 54 for simplicity, inclusive of read only, programmable read only, random access, a hard drive, etc., whether local, remote or a combination of both. An onboard controller 50A of the EV 20 may be similarly configured. The controller 50 may be programmed with computer-readable instructions, stored in non-transitory components of its memory 54 and executable by the processor 52 therefrom, to perform the method 100 of FIG. 4.

Figure 3:
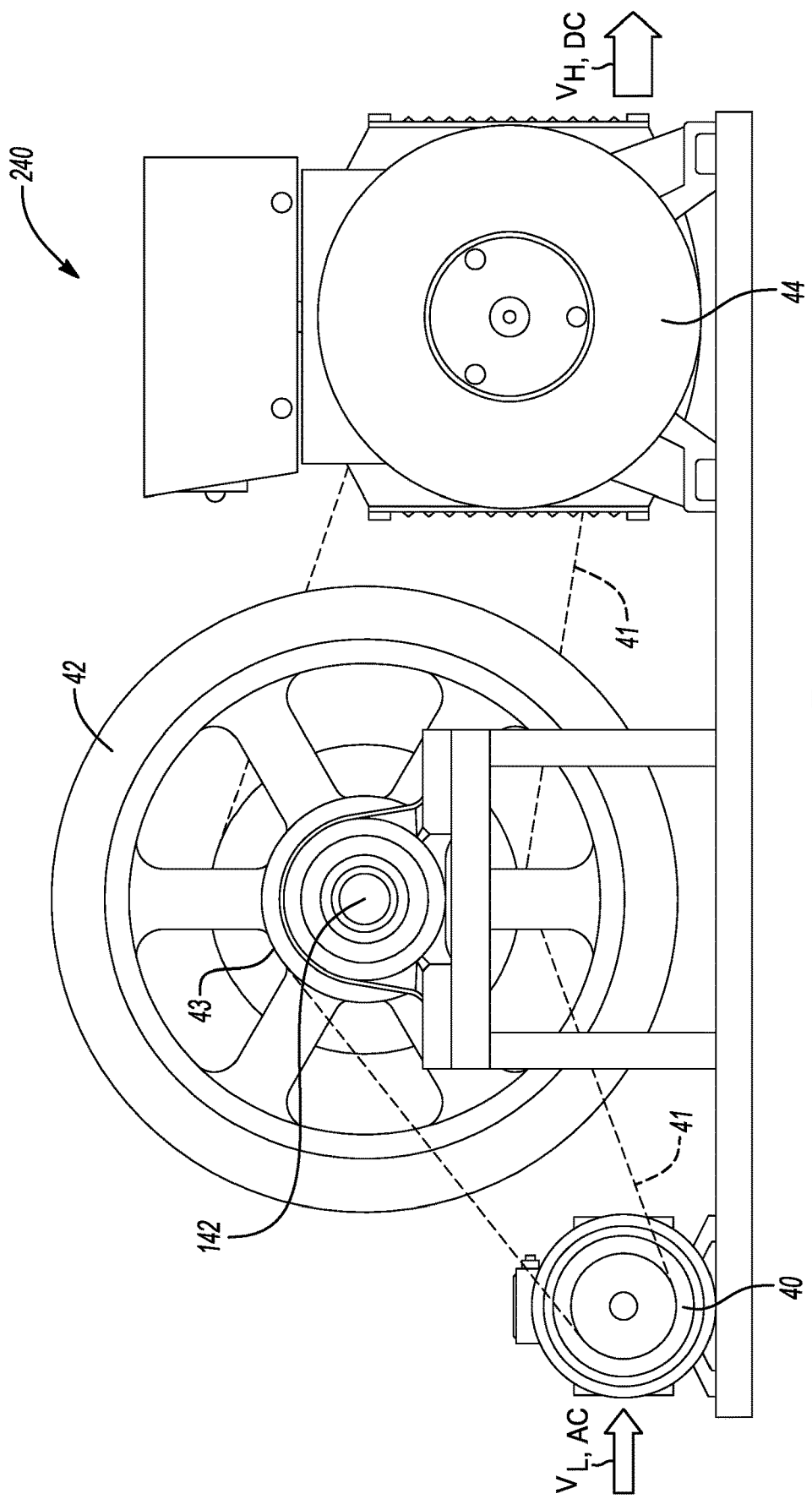
FIG. 3 depicts an alternative embodiment of the power-densifying charging station of FIG. 1 in which a flywheel arrangement is used to store a DC charge.

Referring to FIG. 3, the flywheel arrangement 240 noted above is usable as an alternative construction of the above-described DC storage device 14 of FIGS. 1 and 2. In the illustrated embodiment, the DC power storage device 14 includes a low-power AC motor 40, a mechanical flywheel 42 connected to the AC motor 40, and a high-power DC generator 44 connected to the flywheel 42. A drive mechanism 41, for instance a loop of chain or a drive belt, connects the AC motor 40 to a rotatable hub 43 of the flywheel 42, such that torque from rotation of the AC motor 40 causes the hub 43 to rotate about a shared center axis 142 of the flywheel 42 and the hub 43. The flywheel 42 thus rotates in conjunction with the hub 43 to store kinetic energy.

When needed to perform a DCFC event as contemplated herein, the flywheel 42 may be selectively connected to the DC generator 44, such as using a clutch mechanism (not shown), to thereby cause the DC generator 44 to output the high-power DC charging voltage (arrow $V_{H,DC}$). A possible construction of the flywheel arrangement 240 may include a rated power of about 60-180 kW, energy storage capacity of at least 54 kWh, and a total discharge time of 20-60 minutes. One could implement several of the flywheel arrangements 240 in series or parallel to provide the desired discharge time, as will be appreciated by those skilled in the art, with the flywheel arrangements 240 being analogous to the energy storage cells 140 of FIG. 1.

Figure 4:
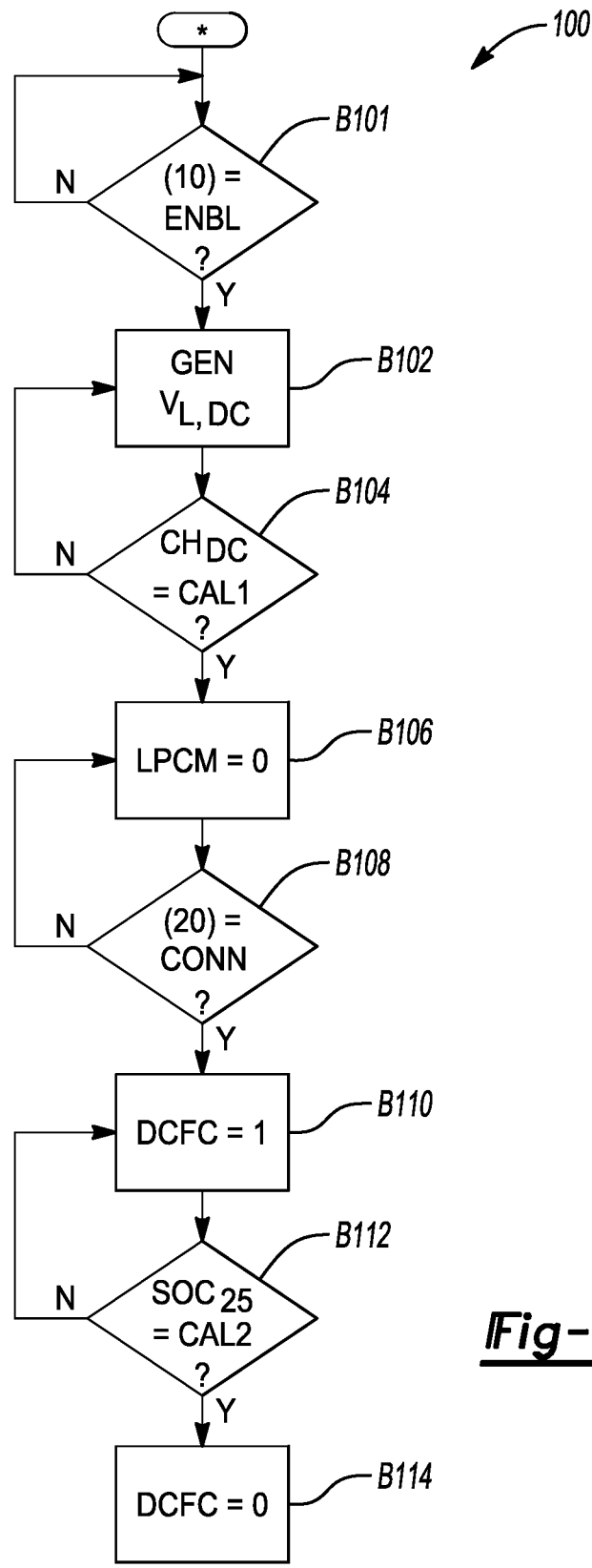
FIG. 4 is a flow chart describing a computer-implementable method for charging a propulsion battery pack of an electric vehicle using the power-densifying charging station of FIG. 1.

Referring now to FIG. 4, the method 100 may be performed by the controller 50 of FIGS. 1 and 2 via execution from its memory 54 of corresponding instructions, algorithms, or code sets. The method 100 is suitable for performing a DCFC sequence for charging an offboard battery pack, e.g., the propulsion battery pack 25 of FIGS. 1 and 2. The method 100 in its various possible implementations acts during separate charge accumulation and charge delivery stages of operation.

During the charge accumulation stage, the method 100 in the representative embodiment of FIG. 4 includes closing the first electrical switch S1 of the power-densifying charging station 10 (see FIG. 2) to connect the LPCM 30 to the low-power energy source 12, which in turn provides the low-power AC input voltage (arrow $V_{L,AC}$) to the LPCM 30. The method 100 also includes transmitting the low-power DC voltage (arrow $V_{L,DC}$) to the DC storage device 14 using the low-power AC input voltage (arrow $V_{L,AC}$) from the LPCM 30, i.e., either a DC pass-through or via an AC-to-DC conversion process depending on the AC or DC capabilities of the energy source 12.

During the charge delivery stage performed subsequent to the charge accumulation stage, the method 100 includes selectively offloading the stored DC charge in the DC storage device 14 as the high-power DC charging voltage (arrow $V_{H,DC}$), to the offboard battery pack 25 via the third electrical switch S3 and the charge coupler 22. Thus, the power-densifying charging station 10 is characterized by an absence of a boost converter, but instead operates by the process of gradual power densification performed over an extended period of time, i.e., the first interval.

The method 100 according to a non-limiting representative embodiment commences after initialization (*) of the controller 50 of FIG. 2 at logic block B101 ("(10) =ENBL?"). In block B101, the controller 50 determines if the EVSE charging station 10 has been enabled for use. Block B101 optionally includes turning on the constituent components of the power-densifying charging station 10, including the LPCM 30. The controller 50 for its part is running after initialization, and the DC storage device 14 for its part remains in a standby mode and thus ready to charge in the discretion of the controller 50.

Block B101 could be implemented using a software application ("app") in one or more embodiments, for instance with a user verifying the state of charge of the DC storage device 14 using such an app. To that end, although omitted from the drawings for illustrative simplicity, the power-densifying charging station 10 may be equipped with one or more voltage sensors operable for determining the SOC of the DC storage device 14 and reporting the same to the controller 50 for use in the app, or such values could be reported to the user in other ways, e.g., via a display screen (not shown), text message, etc. The method 100 proceeds to block B102 after the power-densifying charging station 10 has been enabled.

At block B102 ("GEN $V_{L,DC}$"), the controller 50 next commands receipt and transmission of the low-power DC voltage (arrow $V_{L,DC}$) to the DC storage device 14. Block B102 may entail performing an AC-to-DC conversion process using the AC-to-DC converter 32 shown in FIG. 2, which occurs when the low-power energy source 12 is an AC source, e.g., grid power. In such a case, the energy source 12 of FIGS. 1 and 2 would output the low-power AC input voltage (arrow $V_{L,AC}$). In those instances in which the energy source 12 instead outputs a low-power DC voltage, the LPCM 30 may pass the provided low-power DC voltage through as the low-power DC voltage (arrow $V_{L,DC}$), with possible waveform filtering performed by the LPCM 30 as needed. The method 100 then proceeds to block B104.

At block B104 ("$CH_{DC}$=CAL1?"), the controller 50 may compare the stored DC charge in the DC storage device 14 to a calibrated threshold charge level. For example, the SOC of the DC storage device 14 may be reported to the controller 50 as disclosed above, such that the controller 50 is apprised of the SOC. The controller 50 may compare the reported SOC corresponding to the stored DC charge to a value corresponding to the calibrated threshold charge level, e.g., 60% SOC, 80% SOC, or 100% SOC, for instance using a comparator circuit (not shown). The method 100 thereafter proceeds to block B106 when the stored DC charge in the DC storage device 14 equals or exceeds the calibrated threshold charge level, and repeats block B102 in the alternative.

Block B106 includes disabling operation of the LPCM 30 ("LPCM=0"). That is, 1 and 0 may be used to represent nominal binary "ON/enabled" and "OFF/disabled" states of the LPCM 30 of FIGS. 1 and 2, with LPCM=0 indicating that the LPCM 30 has been turned off, disabled, or otherwise rendered inoperable for outputting or receiving the low-voltage input from the energy source 12. As part of this approach, the controller 50 may open the first electrical switch S1 of FIG. 2 to disconnect the low-power energy source 12 with or without actually changing the operating state of the LPCM 30. The method 100 then continues to block B108.

Block B108 ("(20)=CONN?") of the method 100 shown in FIG. 4 includes determining via the controller 50 if the EV 20 is presently connected to the power-densifying charging station 10 of FIGS. 1 and 2. As appreciated by those skilled in the art, electric vehicle charging involves two-way communication between the power-densifying charging station 10 and the EV 20, via the properly connected charge coupler 22. In this instance such communication occurs between the controllers 50 and 50A of FIG. 2, with the latter typically including an onboard battery management system.

To this end, block B108 may include establishing a pilot communication link with the controller 50A, e.g., via a Controller Area Network (CAN) protocol. Once a communication link has been established through physical engagement of the charge coupler 22 and the DC charging port 24 of the EV 20 shown in FIG. 1, the method 100 proceeds to block B110. The method 100 instead returns to block B106 when the charge coupler 22 has not been connected to the EV 20.

At block B110 ("DCFC=1"), with "1" in this instance signifying an active DCFC event, the controller 50 in cooperation with the controller 50A commences the DCFC process by offloading the stored DC charge from the DC storage device 14 to the high-voltage propulsion battery pack 25 residing aboard the EV 20. To the recipient of the high-power DC charging voltage (arrow $V_{H,DC}$), which is the propulsion battery pack 20 in the representative example of FIG. 4, the high-power DC charging voltage (arrow $V_{H,DC}$) appears identical to a similar charging voltage provided by more traditional DCFC infrastructure. From a practical standpoint, the present solution temporarily extends the benefits of DCFC to locations connected to the low-power energy source 12 instead of a high-voltage/high-power supply, typically an AC supply voltage of 277-480 VAC. The method 100 proceeds to block B112 while the DCFC event is ongoing.

Block B112 includes determining if the battery pack 25 aboard the EV 20 has been sufficiently charged ("$SOC_{25}$=CAL2?"). This action may entail comparing a reported SOC of the propulsion battery pack 25 to the controller 50 via the controller 50 of the EV 20 and thereafter comparing the reported SOC, i.e., $SOC_{25}$, to a stored threshold, i.e., CAL2. Thus, the propulsion battery pack 25 may be deemed sufficiently charged when its SOC reaches a predetermined level, which may be set by the controller 50 ahead of time or requested by the controller 50A of the EV 20 during the DCFC event.

For instance, the controller 50 or 50A of FIG. 2 may terminate charging once the SOC of the propulsion battery pack 25 has reached 80% of a total SOC (nominal 100% level), with CAL2 equaling 80% in this non-limiting illustrative scenario. Block B102 may also include determining whether the SOC of the DC storage device 14 has dropped to below another calibrated limit, for instance 10-20%, to prevent depletion of the DC storage device 14. In this manner, the DC storage device 14 could maintain a minimum reserve. The method 100 proceeds to block B114 when the propulsion battery pack 25 aboard the EV 20 has been sufficiently charged, with the controller 50 repeating blocks Bi 10 and Bi 12 in a loop until this condition has been satisfied.

Block B114 ("DCFC=0") includes discontinuing the DCFC event, with "0" representing such a state. For example, the controller 50 could implement block B114 by opening the third switch S3 of FIG. 2, an action that would cut off supply of the high-power DC charging voltage (arrow $V_{H,DC}$) to the EV 20 without regard to the ON/OFF state of the respective first and second electrical switches S1 and S2. Therefore, a user of the EV 20 could drive away while the power-densifying charging station 10 of FIG. 2 charges the DC storage device 14 in preparation for another DCFC event.

The power-densifying charging station 10 of FIGS. 1-3 and the accompanying method 100 of FIG. 4 may be used to effectively densify low-power energy from traditional AC or DC sources and thereafter store the densified energy for later use as a convenient albeit temporary/short-term high-voltage source for use in a DCFC event. High-power levels of up to 350 kW may be possible using the disclosed solutions. The various circuits shown in FIGS. 1-3 provide several attendant benefits. For example, the number of consecutive charging and discharging cycles is practically unlimited, with high power densities and discharge capacities being attainable over the relatively short duration of the above-noted second internal.

The solutions, which are highly scalable, may be enjoyed off-grid in some circumstances, as the charge delivery stage is independent from the charge accumulation stage, and as the low-power energy source 12 of FIGS. 1 and 2 may include local sources such as fuel cells, wind or water-driven turbines, solar panels, and the like. Moreover, high-power output is enjoyed without adversely affecting grid power, which in turn may be used during periods of low demand to minimize the costs associated with the charge accumulation stage. These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A power-densifying charging station comprising:
a low-power charging module (LPCM) configured to receive a low-power input voltage from a low-power energy source;
a charging cable;
a charge coupler connected to the charging cable and configured to connect to a high-voltage battery pack;
a direct current (DC) storage device connected to the charging cable and operable for accumulating a high-power direct current (DC) charging voltage from the low-power input voltage during a charge accumulation stage of operation, the DC storage device including a flywheel arrangement operable for outputting a high power DC charging voltage to the high-voltage battery pack, via the charging cable and the charge coupler, during a charge delivery stage of operation;
a plurality of electrical switches operable for selectively connecting the charging station to the low-power energy source, the LPCM to the DC storage device, and the DC storage device to the high-voltage offboard battery pack during the charge delivery stage of operation; and
a controller in communication with and operable for controlling a corresponding state of the LPCM, the DC storage device, and the plurality of electrical switches during the charge accumulation stage and the charge delivery stage, wherein the charging station is characterized by an absence of use of a boost converter, and wherein the controller is configured to:
disable the LPCM when the DC storage device reaches a predetermined charge threshold; and
control the plurality of electrical switches to disconnect the low-power energy source from the DC storage device during the charge delivery stage.

2. The charging station of claim 1, wherein the low-power energy source includes an alternating current (AC) power supply, and wherein the LPCM includes an AC-to-DC converter operable for converting the low-power input voltage from an AC waveform to a DC waveform.

3. The charging station of claim 2, wherein the AC power supply includes residential or commercial grid power.

4. The charging station of claim 1, wherein the charge coupler is a Level 3 DC charge coupler configured to connect the DC storage device to an external system having the high-voltage battery pack.

5. The charging station of claim 4, wherein the external system is an electric vehicle (EV) having a DC charging port, and the high-voltage battery pack is a propulsion battery pack of the EV, and the Level 3 DC charge coupler is configured to connect to the DC charging port.

6. The charging station of claim 4, wherein the low-power input voltage is less than 240 VAC and the high-voltage battery pack has a voltage capability of at least 400 VDC.

7. The charging station of claim 1, wherein the flywheel arrangement comprises:
a low-power AC motor;
a flywheel connected to the low-power AC motor; and
a high-power DC generator connected to the flywheel.

8. A method for densifying power from a low-power energy source using a power-densifying charging station, comprising:
during a charge accumulation stage of operation:
closing a first electrical switch of the charging station to thereby connect a low-power charging module (LPCM) of the charging station to the low-power energy source, wherein the low-power energy source provides a low-power input voltage to the LPCM; and
accumulating a high-power direct current (DC) charging voltage in a DC storage device of the charging station using the low-power input voltage from the LPCM, wherein the DC storage device includes a flywheel arrangement operable for outputting a high-power DC charging voltage to a high-voltage battery pack, via a DC charge coupler and a charging cable, during a charge delivery stage subsequent to the charge accumulation stage; and
disabling the LPCM when the DC storage device reaches a predetermined charge threshold; and
during the charge delivery stage subsequent to the charge accumulation stage, selectively offloading the high-power DC charging voltage from the DC storage device to the high-voltage battery pack of an external device via a third electrical switch and the DC charge coupler, wherein the charge accumulation stage and the charge delivery stage are characterized by an absence of use of a boost converter; and
controlling the plurality of electrical switches to disconnect the low-power energy source from the DC storage device during the charge delivery stage.

9. The method of claim 8, wherein the low-power energy source is an alternating current (AC) power supply, the method further comprising: using an AC-to-DC converter of the LPCM to convert the low-power input voltage to a low-power DC voltage.

10. The method of claim 9, wherein closing the first electrical switch of the charging station to thereby connect the LPCM to the low-power energy source includes connecting the LPCM to residential or commercial grid power.

11. The method of claim 8, wherein selectively offloading the high-power DC charging voltage from the DC storage device to the high-voltage battery pack includes offloading the high-power DC charging voltage to a propulsion battery pack of an electric vehicle (EV) using a Level 3 charge coupler as the DC charge coupler.

12. The method of claim 11, wherein the low-power input voltage is less than 220 VAC and the propulsion battery pack has a voltage capability of at least 400 VDC.

13. The method of claim 8, wherein accumulating the high-power DC charging voltage in the DC storage device comprises:
energizing a low-power AC motor of the flywheel arrangement;
rotating a flywheel of the flywheel arrangement via torque from the low-power AC motor; and
selectively energizing a high-power DC generator of the flywheel arrangement using a torque from the flywheel.

14. A power-densifying charging station, comprising:
a charging cable;
a Level 3 direct current (DC) charge coupler connected to the charging cable and configured to connect to a high-voltage battery pack of an electric vehicle (EV) via a DC charging port of the EV;
a low-power charging module (LPCM) configured to receive a low-power alternating current (AC) input voltage from a residential or commercial grid, the LPCM having an AC-to-DC converter operable for converting the low-power AC input voltage to a low-power DC voltage;
a direct current (DC) storage device connected to the charging cable and having a flywheel arrangement operable for accumulating a high-power direct current (DC) charging voltage from the low-power DC voltage during a charge accumulation stage of operation, and for outputting a high-power DC charging voltage to a high-voltage propulsion battery pack, via the charging cable and the Level 3 DC charge coupler, during a charge delivery stage;
a plurality of electrical switches operable for selectively connecting the charging station to the residential or commercial grid, the LPCM to the DC storage device, and the DC storage device to the high-voltage propulsion battery pack of the EV during the charge delivery stage of operation;
a controller in communication with and operable for controlling the LPCM, the DC storage device, and the plurality of electrical switches during the charge accumulation stage and the charge delivery stage, wherein the controller is operable for offloading the high-power DC charging voltage to the propulsion battery pack via the charging cable and the Level 3 DC charge coupler during the charge delivery stage of operation, wherein the controller is configured to:
disable the LPCM when the DC storage device reaches a predetermined charge threshold; and
control the plurality of electrical switches to disconnect the low-power energy source from the DC storage device during the charge delivery stage.

15. The power-densifying charging station of claim 14, wherein the low-power AC input voltage is less than 240 VAC and the high-voltage battery pack has a voltage capability of at least 400 VDC.

16. The power-densifying charging station of claim 14, wherein the flywheel arrangement comprises:
a low-power AC motor, a flywheel connected to the AC motor, and a high-power DC generator connected to and configured to receive a torque from the flywheel.

17. The power-densifying charging station of claim 14, wherein the DC storage device is configured to discharge for less than 60 minutes during the charge delivery stage.

18. The power-densifying charging station of claim 17, wherein the DC storage device is configured to discharge for 20-60 minutes during the charge delivery stage.

19. The power-densifying charging station of claim 14, wherein the high-power DC charging voltage is at least ten times the low-power DC voltage.

20. The power-densifying charging station of claim 19, wherein the high-power DC charging voltage is 50-350 kilowatts (kW) and the low-power DC voltage is 5-10 kW.

* * * * *